United States Patent
Camitz

[15] 3,664,121
[45] May 23, 1972

[54] CHAIN LINK
[72] Inventor: Carl-Henning Camitz, Ramnas, Sweden
[73] Assignee: Ramnas Bruks Aktiebolag, Ramnas, Sweden
[22] Filed: Sept. 8, 1970
[21] Appl. No.: 70,065

[52] U.S. Cl. ............................................................59/84
[51] Int. Cl. ......................................................F16g 13/06
[58] Field of Search .........................59/84, 90; 152/283, 245

[56] References Cited
UNITED STATES PATENTS
1,256,118  2/1918  Duncan ......................................59/84
2,110,474  3/1938  Reyburn ...............................152/245

*Primary Examiner*—Charles W. Lanham
*Assistant Examiner*—Gene P. Crosby
*Attorney*—Wenderoth, Lind and Ponack

[57] ABSTRACT

A chain link having a central stud between the sides of the link and a weld at least in one side. The stud is provided with a notch at least in the end facing the weld shaped so that the weld is visible also at the inside of the link. The stud is symmetrical and has notches at both ends.

2 Claims, 1 Drawing Figure

PATENTED MAY 23 1972 3,664,121
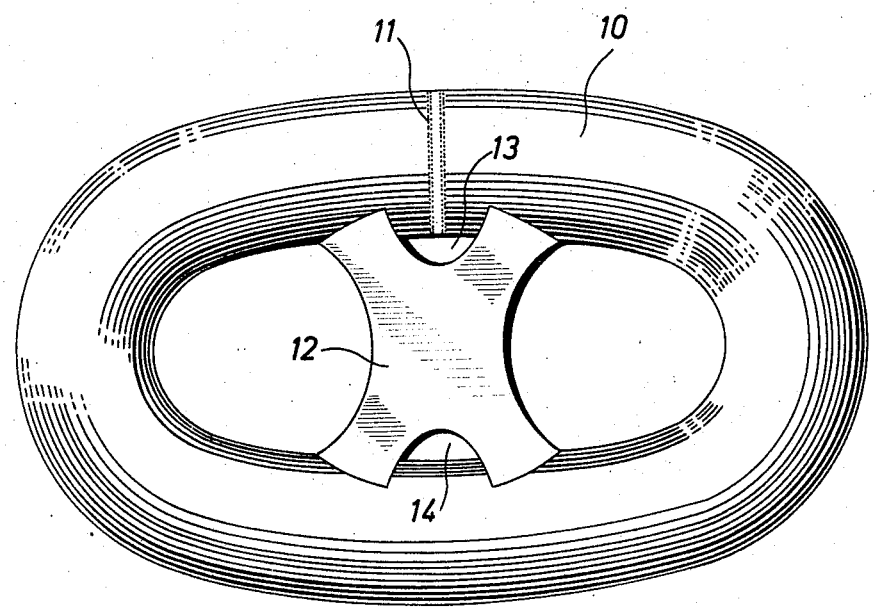
CARL-HENNING CAMITZ,
Inventor
By Wendwroth Lind and
Ponack   Attorneys

CHAIN LINK

The present invention relates to a chain link, especially for anchor chains and the like, and more particularly the invention relates to a link of the kind provided with a central stud.

Chain links of the kind mentioned are normally produced by cutting bar material and shaping it into a usually oval link loop whereupon the two ends of the loop are joined by resistance flash welding, so that a closed link is obtained. Following this, and while the link is hot, the central stud is pressed into the link so that the stud will lie along the small axis of the oval. Therefore, the stud will cover the weld at the inside of the link. This has been found inconvenient, since thereby it becomes impossible to discover such cracks as may appear in the weld at the inside of the link, where the greatest tensile stress occurs.

The object of the invention is to create a chain link of the kind mentioned, where the weld is made visible, and for this purpose the invention is characterized substantially in that the stud is designed with a notch at least at the end facing the weld, said notch being shaped such that the weld is visible also at the inside of the link.

The invention will be described in more detail with reference to the accompanying drawing, in which an embodiment of an anchor chain link according to the invention chosen as an example is shown.

The chain link shown has the shape of an oval loop 10 of bar material. The loop is closed by means of a diagrammatically indicated resistance flash weld 11. A stud 12 is pressed centrally into the link in such a way that it lies along the small axis of the oval.

According to the invention, the stud 12 has a notch 13 in the end facing the weld 11, said notch being shaped such as to allow a view of the weld also from the inside of the link.

Because the stud 12 is normally pressed into the link while the link is hot, it might possibly happen that the notched end of the stud would be pressed deeper into one side of the link than into the other so that the link would become unsymmetrical. To avoid this, the invention comprises providing the stud with a notch 14 at the other end as well, so that it is quite symmetrical.

It may be added that the invention is of course applicable also to links having two welds located diametrically opposite to each other. However, such links are not very common.

Modifications and alterations of details are possible within the scope of the inventive idea.

I claim:

1. A chain link having a central stud between the sides of the link and a weld at least in one side, said stud having a notch at least in the end facing said weld, said notch being open so that said weld is visible also at the inside of the link.

2. A chain link as claimed in claim 1 wherein said stud is symmetrical and has notches at both ends.

* * * * *